US 6,572,157 B2

(12) United States Patent
Kaute et al.

(10) Patent No.: US 6,572,157 B2
(45) Date of Patent: Jun. 3, 2003

(54) DEVICE FOR THE INTERLOCKING OF TWO POSITIVELY GUIDED ELEMENTS ADJUSTABLE RELATIVE TO ONE ANOTHER

(75) Inventors: Markus Kaute, Weil der Stadt (DE); Klaus Obendiek, Passau (DE); Eckart Schuler, Sindelfingen (DE); Sigfried Zipperle, Aidlingen (DE)

(73) Assignee: CTS Fahrzeug Dachsysteme GmbH, Korntal-Munchingen (DE)

( * ) Notice: Subject to any disclaimer, the term of this patent is extended or adjusted under 35 U.S.C. 154(b) by 123 days.

(21) Appl. No.: 09/734,594

(22) Filed: Dec. 13, 2000

(65) Prior Publication Data

US 2001/0042998 A1 Nov. 22, 2001

(30) Foreign Application Priority Data

Dec. 13, 1999 (DE) .......................................... 199 60 012

(51) Int. Cl.⁷ .................................................. E05C 3/06
(52) U.S. Cl. ................................. 292/201; 292/DIG. 5; 296/109
(58) Field of Search ............................ 292/341.16, 201, 292/DIG. 43, DIG. 5; 296/109, 135, 136

(56) References Cited

U.S. PATENT DOCUMENTS

| 3,891,252 A | 6/1975 | Lehmann ........................ 292/6 |
| 4,886,307 A | 12/1989 | Ruckert ....................... 292/216 |
| 5,269,586 A | 12/1993 | Hahn et al. .................. 296/224 |
| 5,443,292 A | 8/1995 | Shimada et al. ....... 292/341.16 |
| 5,620,226 A | 4/1997 | Sautter. ....................... 296/107 |
| 6,095,589 A | 8/2000 | Kinnanen et al. ...... 296/107.09 |
| 6,290,281 B1 | 9/2001 | Durrani et al. ............. 296/121 |

FOREIGN PATENT DOCUMENTS

| DE | C 15 05 721 | 4/1966 |
| DE | 3743282 | 7/1989 |
| DE | 4111646 | 10/1992 |
| EP | 0657607 | 6/1995 |

OTHER PUBLICATIONS

European Search Report.

*Primary Examiner*—Gary Estremsky
(74) *Attorney, Agent, or Firm*—Crowell & Moring LLP

(57) ABSTRACT

A device for the interlocking of two positively guided elements adjustable relative to one another is designed to the effect that, with respect to the open state, there is a position of readiness which has to be canceled by the elements running toward one another, before a transfer into the interlocking position is possible via the actuating drive.

39 Claims, 7 Drawing Sheets

Figure 1:
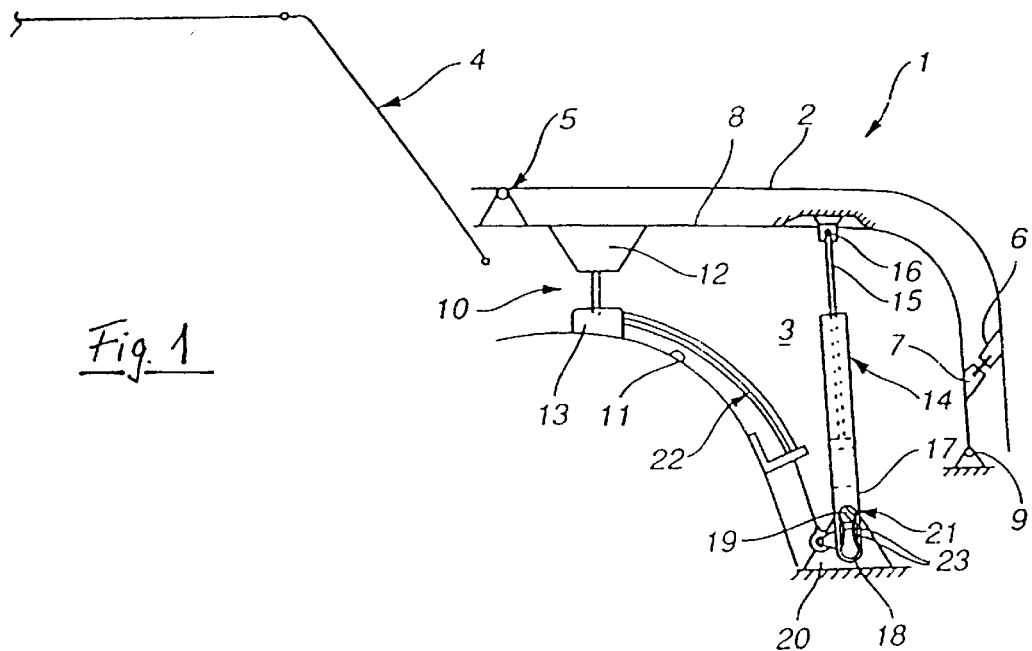

DEVICE FOR THE INTERLOCKING OF TWO POSITIVELY GUIDED ELEMENTS ADJUSTABLE RELATIVE TO ONE ANOTHER

The invention relates to a device for the interlocking of two positively guided elements adjustable relative to one another in an interlocking position according to the preamble of claim 1.

A known device of the abovementioned type (DE-C 15 05 721) serves for interlocking a motor vehicle folding top in its closed position, in which the folding top is braced at the front against the cowl of the windshield. For this purpose, the folding top is provided with a countermember which is equipped as a lug and which is assigned as an interlocking member, on the cowl, a hook which is articulated on the cowl via a guide mechanism and is capable of being adjusted by means of an actuating drive in the form of a hydraulic cylinder. In this case, as a rule, the hook assumes a position countersunk into the cowl, specifically when the folding top is both closed and open, and, via the adjusting drive, for the purposes of interlocking the folding top said hook is pivoted out of the cowl, when the folding top approaches the latter, into a position of readiness, in which it can grasp the lug, move it into the interlocking position and hold it in this. The outward movement of the hook into the position of readiness is triggered by a tracer assigned to the folding top, when the folding top approaches its interlocking position in relation to the cowl, the tracer acting upon a control valve, via which the hydraulic cylinder serving as an actuating drive is activated. The hydraulic cylinder is incorporated into the hydraulic circuit in such a way that the actuating piston is constantly loaded with pressure on the piston-rod side, with respect to the opposite side which is assigned the piston surface of larger cross section, but is connected to the hydraulic circuit, so as to be capable of being cut in and cut out, via a valve. In the known solution, the retracted position of the hydraulic cylinder corresponds to the position of readiness of the hook and the extended position corresponds to the interlocking position, so that, during transfer into the interlocking position, the operation is conducted counter to the working pressure prevailing constantly on the piston-rod side and separate securing of the interlocking position must be carried out.

In view of the fact that the position of readiness constitutes an extended position for the hook as an interlocking member and this position of readiness can be approached only as long as the countermember, that is to say the lug, does not lie in the path of adjustment of the hook, the trigger pin must either project relatively far and/or be offset to the hook and lug. This results, overall in a relatively complicated construction, in which, because of the transmission ratios of the actuating drive, it is also necessary for the latter to have relatively high-value dimensioning.

The object on which the invention is based is to provide a device of the type initially mentioned, which makes it possible to have a makeup simplified according to the invention and on the basis of which a simple control for pulling-shut closures can be implemented.

This is achieved, according to the invention, by means of the defining features of claim 1, the pulling-shut or interlocking operation being initiated automatically when the elements to be interlocked approach one another, in that, in the course of the approach, near the end position of the elements in the interlocked state, a position of readiness initially provided, specifically, provided as a blocking position, is triggered and adjustment is thereby enabled via the actuating drive, via which the interlocking member is consequently transferred into the interlocking position. Since the interlocking member, in its position of readiness, is initially blocked with respect to forces introduced in the pulling-shut direction via the actuating drive, that is to say cannot be moved correspondingly via the actuating drive, the actuating drive can be "prestressed" in the pulling-shut direction, for example, by the actuating drive being designed as a hydraulic cylinder which is permanently connected in the pulling-shut direction to the delivery side of the hydraulic supply. For this purpose, the hydraulic cylinder is installed in such a way that the piston-rod side of the cylinder is openly connected to the pressure source, so that controlled activation is necessary only in the opposite direction, that is to say, for example, for opening or for erection, since, with the pressures being the same, the counterforce acting on the piston-rod side is lower as a result of the surface differences.

Adjustment out of the position of readiness, as blocking position, in the direction of the interlocking position, may be carried out via the counterelement, or a part assigned to this, in particular, the countermember, so that this function does not necessitate any additional parts.

With a view to securing the position of readiness, as blocking position, positive blocking proves to be particularly advantageous, but, depending on the magnitude of the forces exerted via the counterelement on the interlocking member in the approach to the interlocking position, non-positive support, for example support by means of a spring stop, as an overrideable stop, may also be sufficient. The latter possibility is adopted, for example, in the case of heavy lid parts which, when being pivoted in onto the element carrying the interlocking member, are to be absorbed by braking, so that the interlocking operation as such can be accurately controlled.

In this respect, too, inter alia, particularly diverse and expedient possibilities are afforded, within the scope of the invention, in the design of the guide mechanism as a link mechanism, since this provides particularly good preconditions for securing the position of readiness in a direction of adjustment, for example, by means of a beyond dead center position as a blocking position, and, where appropriate, for also securing the interlocking position in a corresponding way, so that, in both positions, corresponding mechanical safeguards are achieved, without additional measures, purely on the basis of the mechanism functions, this being essential, particularly for the interlocking position, so that the interlocking position can be maintained independently of the pressure supply.

Particularly in conjunction with an embodiment of this kind, it is also possible, while the actuating force applied by the actuating drive remains the same, to vary the force component acting on the interlocking lever, in such a way that, starting from the position of readiness, said force component increases in the direction of the interlocking position and reaches a maximum within the region of the interlocking position. Such a profile proves to be expedient, inter alia, also in terms of safety aspects for example as pinch protection, especially since, in conjunction with such a step-up, a rise in the closing speed, starting from the position of readiness, can be achieved.

Within the scope of the invention, a link mechanism which proves expedient is, in particular, a link mechanism which forms a four-bar linkage, and which, in the position of readiness and/or in the interlocking position, has end positions which, for example, preferably constitute beyond dead center positions. For this purpose, of the links connecting the base and coupler of the four-bar linkage, one is approximately in alignment with the coupler, in the position corresponding to the position of readiness, and the other is approximately in alignment with the coupler, in the position corresponding to the interlocking position, and this also makes it possible, in the case of an appropriate assignment of the interlocking lever to the link mechanism, to have a flat mechanism makeup in the direction of the pivoting plane.

For this purpose, and for simplifying the overall makeup, it proves expedient to connect the interlocking member to the link mechanism at the articulation point of one link on the coupler and to select the articulation point of the other link on the coupler, for the articulation of the actuating drive on the link mechanism. This dispenses with separate articulation points and also results in particularly favorable force conditions.

According to the invention, for controlling the pivoting travel between the position of readiness and the interlocking position, the connecting member is assigned a positive sliding coupling at a guide point fixed in position in relation to the base of the four-bar linkage, and it proves to be simple and expedient for the guide point of the positive sliding coupling to be formed by one of the base-side articulation points of the link mechanism. It is particularly expedient if the base-side guide point of the positive sliding coupling is formed by the base-side articulation point of the link, at whose articulation point on the coupler the actuating drive engages, so that the articulation points of the four-bar linkage assume a double function in terms of the articulation of the actuating drive and the articulation of the interlocking member, thus simplifying the overall makeup.

With a view to the interlocking of the elements, the interlocking member and the countermember are each assigned a coupling member, and the coupling members provided may expediently be, on the one hand, a coupling pin and, on the other hand, a coupling mouth.

In view of the fact that, in conjunction with the coupling members running onto one another when the elements approach one another, the blocking position provided in the position of readiness must first be canceled, it proves expedient if the coupling mouth has a design and is arranged, in conjunction with the coupling pin assigned to the interlocking member, such that one flank of the coupling mouth forms for the coupling pin a catching surface, from which the coupling pin changes so as to come to bear against the other flank, which forms a detaining surface, in the course of the further adjustment of the interlocking member in the direction of the closing position, the flank which contains the catching surface extending beyond the detaining flank in the opposite direction to the jaw of the coupling mouth, so that, in the case of a flat pivoting travel of the interlocking lever, it is possible, in the region of the coupling pin carried by the latter, to have a secure grasp of the coupling pin via the coupling mouth.

Within the scope of the invention, the assignment of the coupling pin to the interlocking member and of the coupling mouth to the countermember forms a preferred embodiment particularly when the interlocking member is assigned to the fixed element, against which the countermember assigned to the counterelement is pivotable. The countermember may be formed, for example, by a holder for a trunk lid or else by a trunk lid, while the interlocking member together with the associated guide mechanism is assigned to the other element, that is to say, for example, to the body of a vehicle. Depending on the respective application, however, it is also possible to assign the coupling pin to the countermember and the coupling mouth to the interlocking member.

Furthermore, within the scope of the invention, it proves expedient if the plane of the coupling mouth is approximately perpendicular to the coupling pin and the pivoting plane of the parts to be interlocked coincides approximately with the pivoting plane of the interlocking member. Within the scope of the invention, however, this is not mandatory, but on the contrary the pivoting plane of the elements may also lie transversely to the pivoting plane of the interlocking member.

As stated above, a hydraulic adjusting mechanism, in particular a hydraulic actuating cylinder, proves expedient for the actuating drive. The connection between the respective driving element of the actuating drive and the interlocking member may be made as a function of structural conditions, but also via separate linkage connections, Bowden cables or the like. Furthermore, an electrical embodiment of the actuating drive is also possible within the scope of the invention.

The interlocking member is referred to above in terms of its interaction with the countermember for the purpose of a pulling-shut function. With the sequence reversed, however, the interlocking member may also be used, after the release of the interlock, for transferring the countermember and the counterelement assigned to the latter into a position which corresponds to the position of readiness of the interlocking member, that is to say into a slight opening position for the counterelement, for example in a function as an actuating aid.

The embodiment according to the invention of the interlocking device also proves to be expedient from the point of view of tolerance, since both setting possibilities, for example by an increase or reduction in the beyond dead center position, are possible with respect to the end positions and the interaction of the coupling mouth and coupling pin allows tolerances both in the longitudinal direction of the coupling mouth and transversely thereto, such as are expedient, in particular, in the vehicle construction sector for adjusting and regulating work, especially in repair situations.

Figure 2:
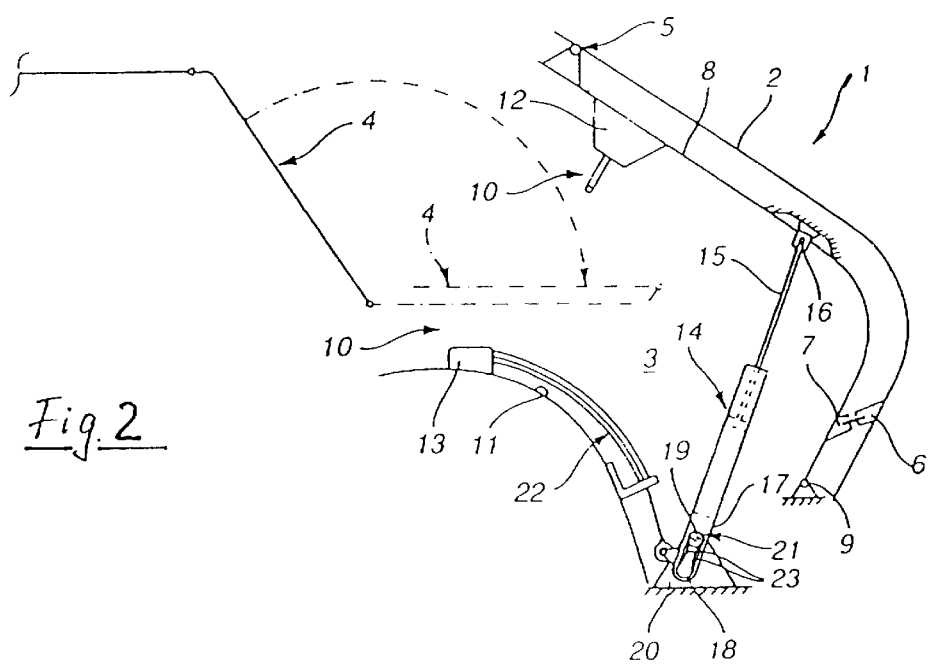
Figure 3:
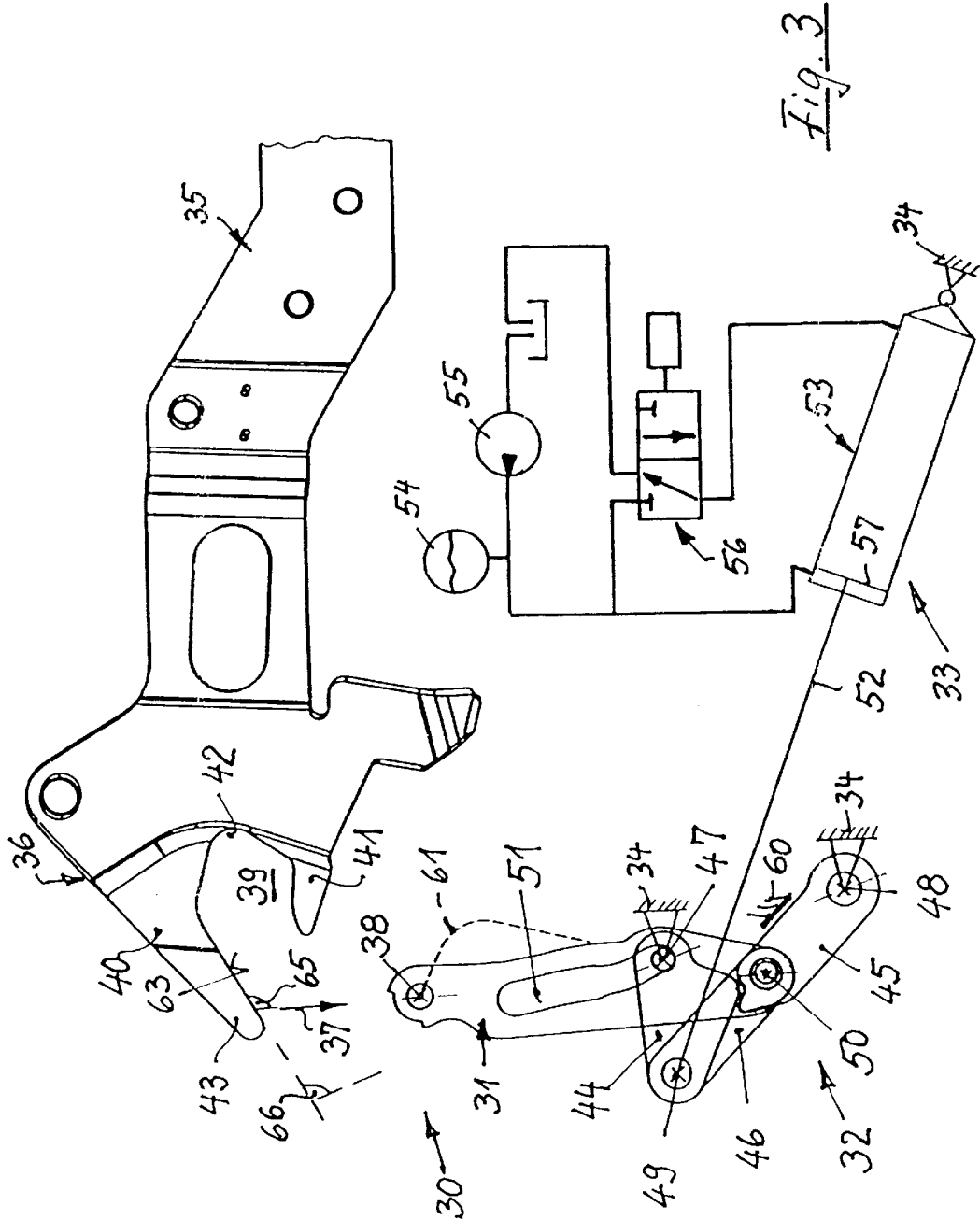
Figure 4:
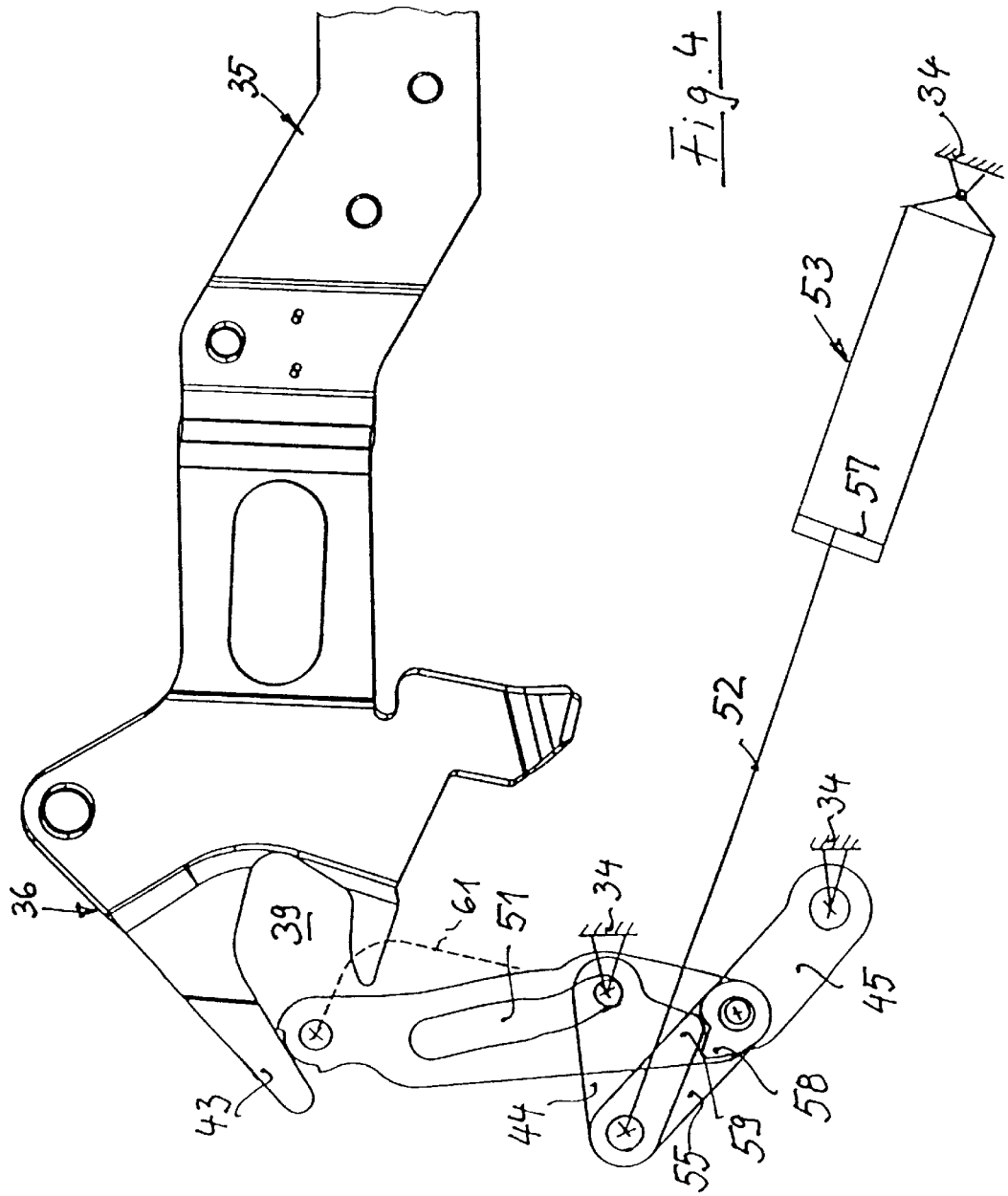
Figure 5:
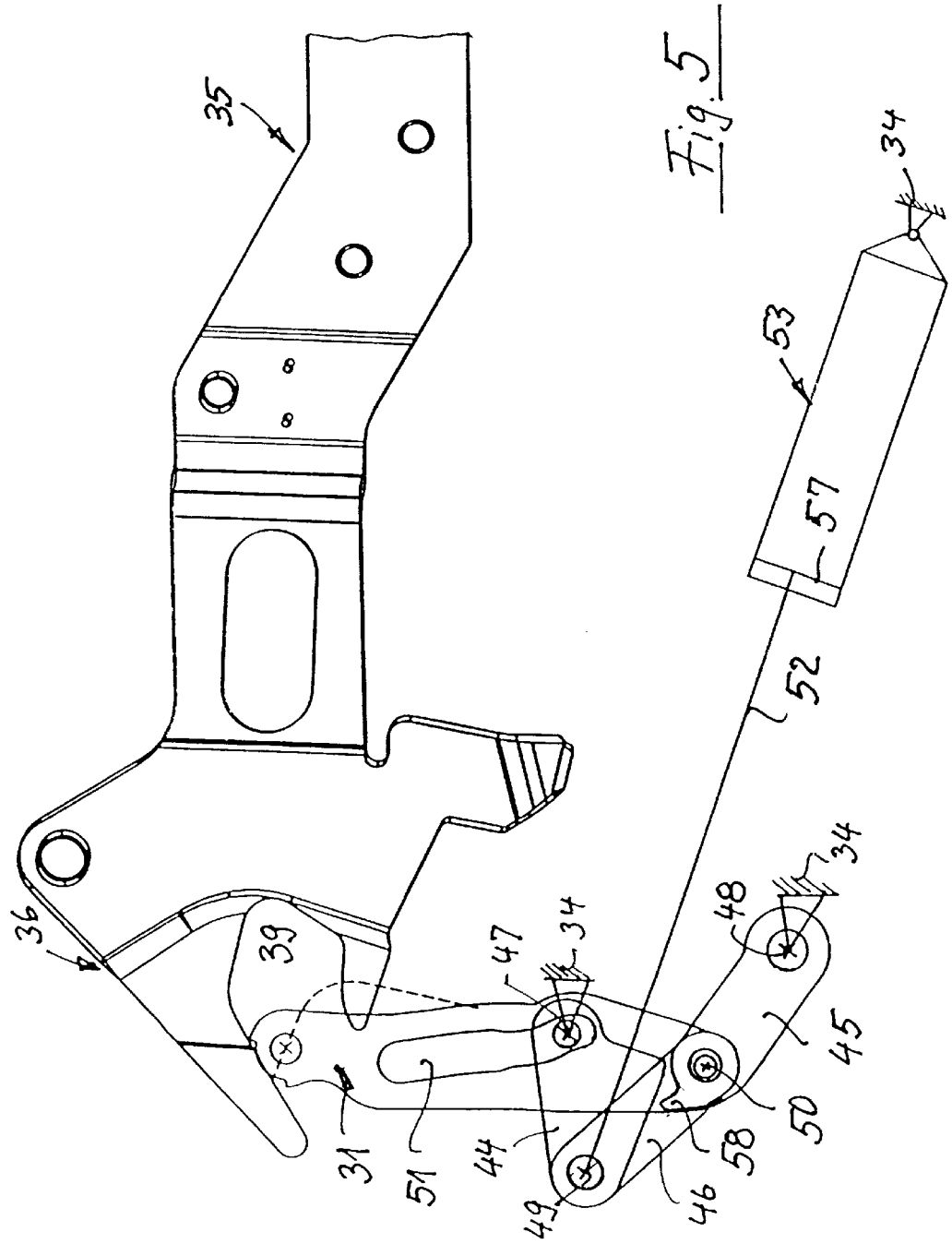
Figure 6:
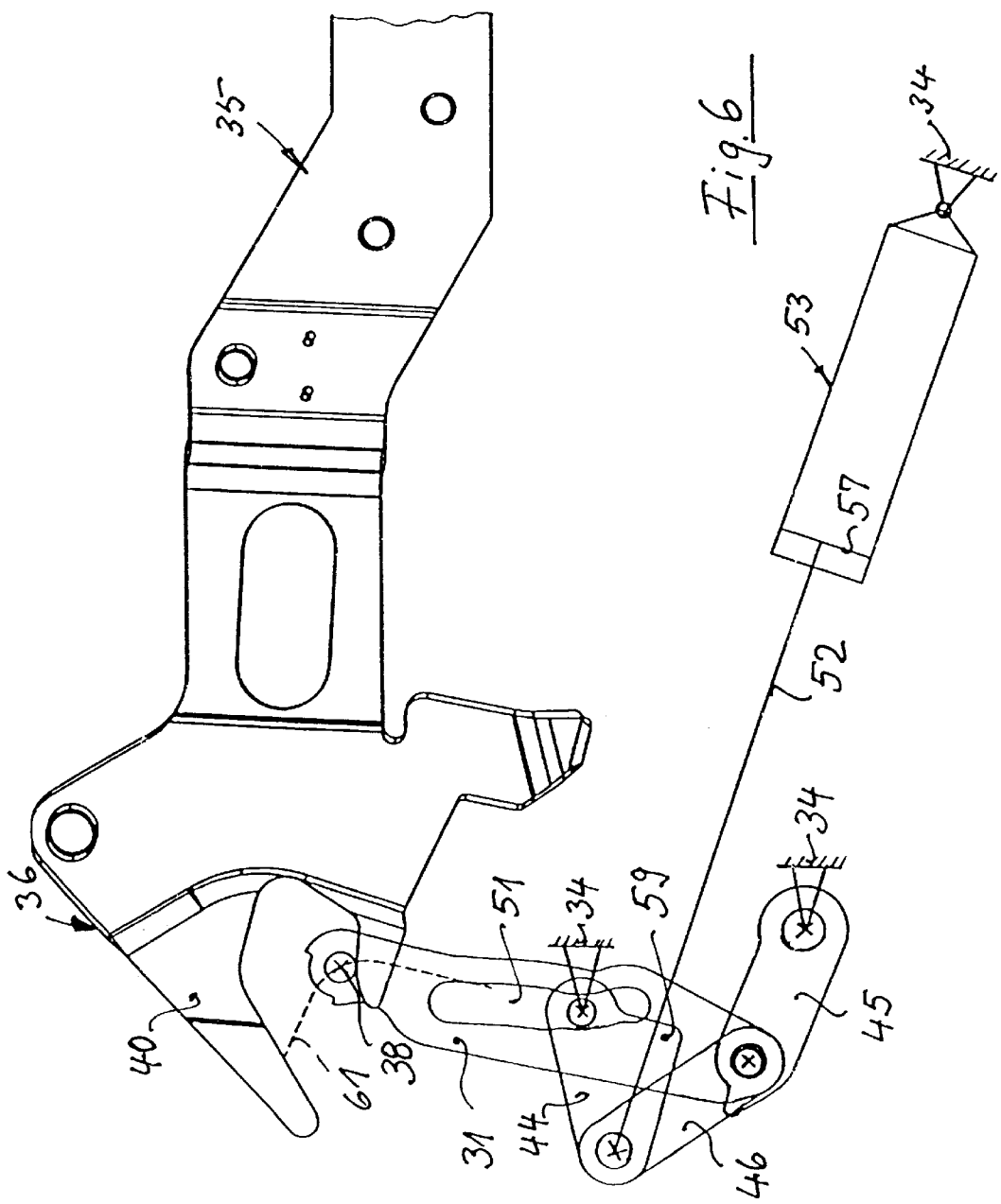
Figure 7:
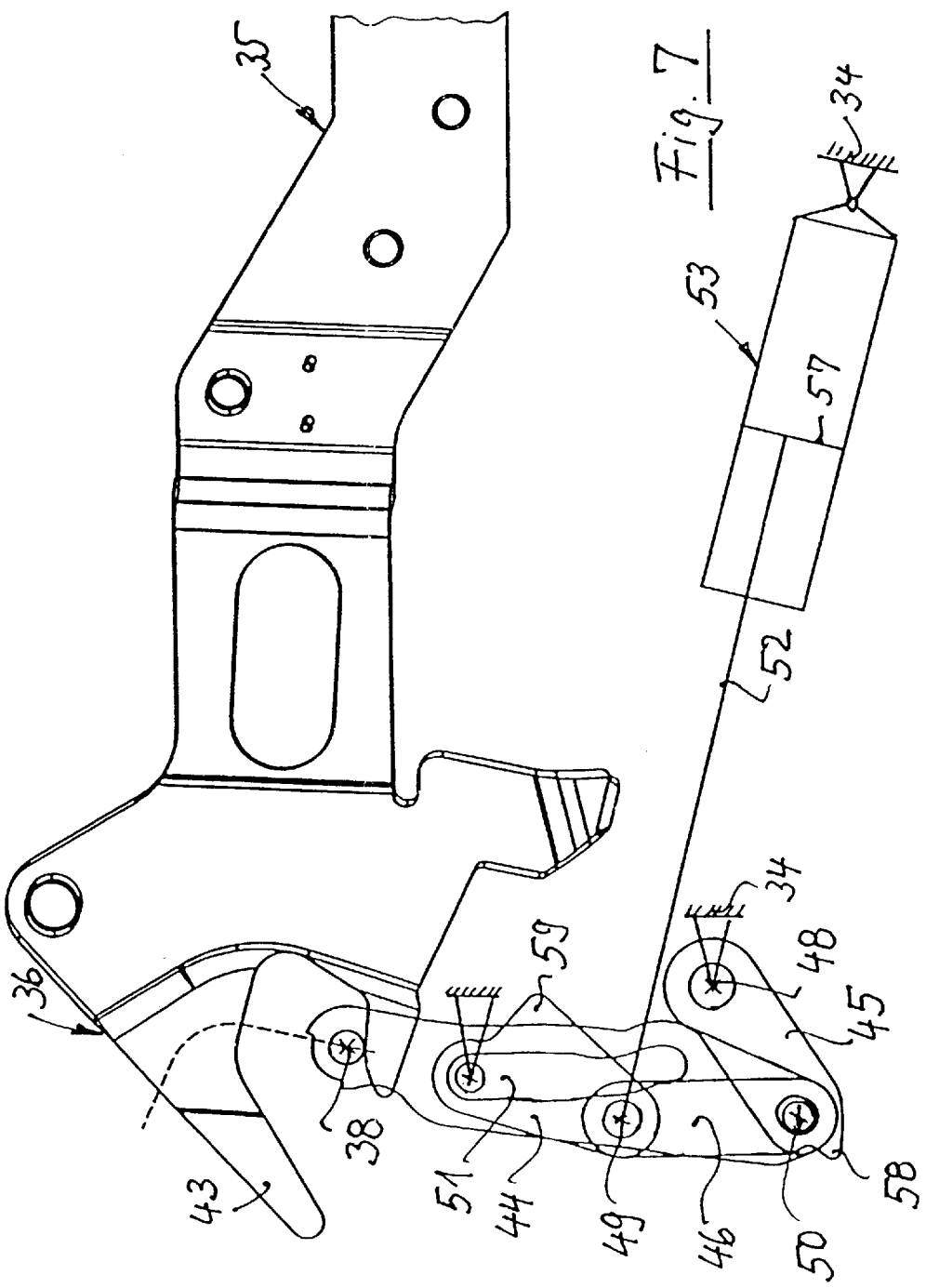
Figure 8:
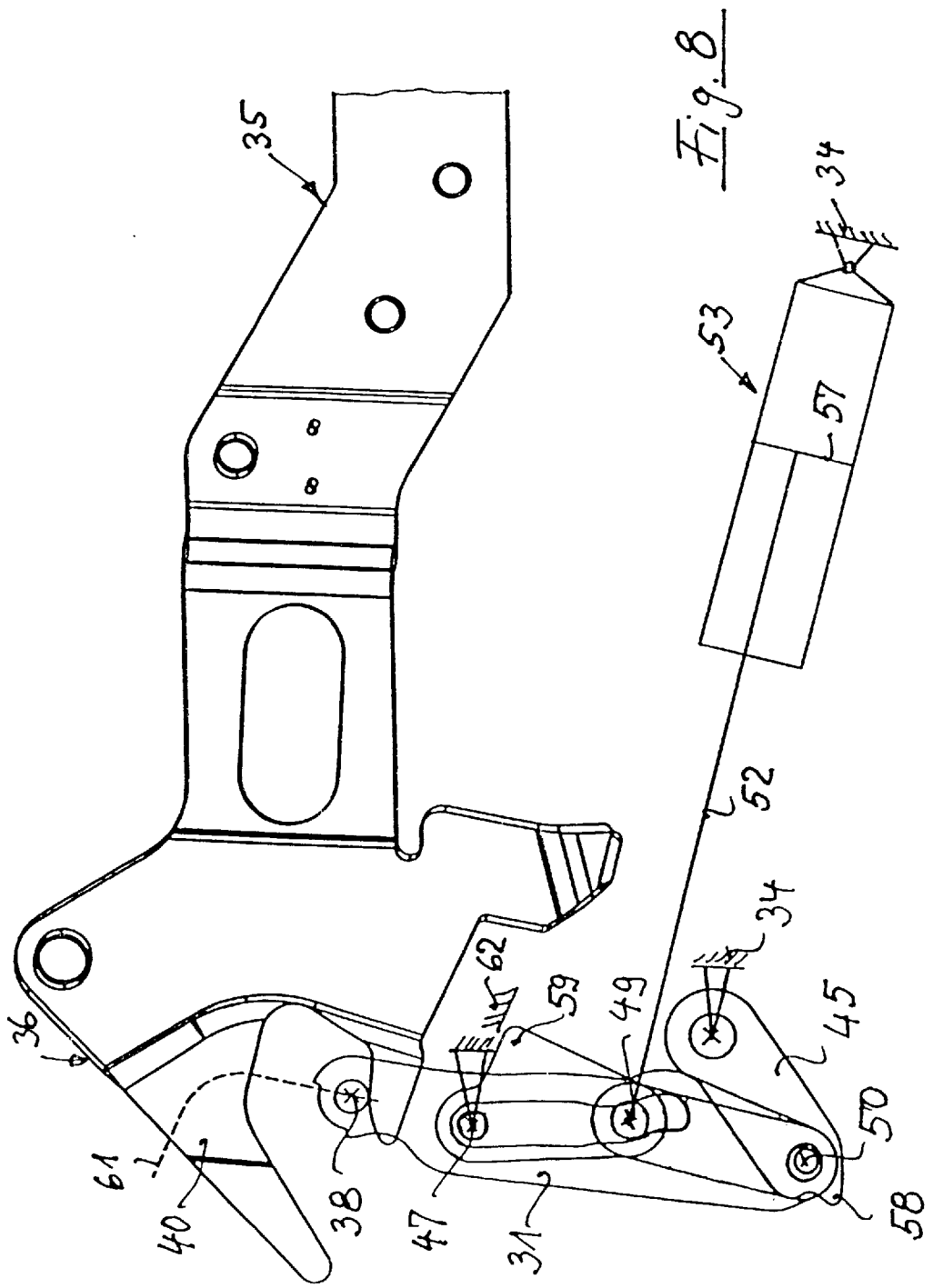

Further particulars and features of the invention may be gathered from the claims. Moreover, the invention, together with further details, is also explained with reference to the drawings in which:

FIG. 1 shows a highly diagrammatic side view of the rear part of a motor vehicle with a folding is top and with a trunk lid, below which the stowaway box for the folding top brought into its opening position is located at least partially, specifically with the trunk lid closed, FIG. 2 shows an illustration corresponding to that of FIG. 1, with the trunk lid in a pivoting position in which the stowaway box is exposed and in which said trunk lid is pivoted rearward and upward via an associated carrying frame and after the release of the front interlocking device assigned to the latter, FIG. 3 shows a highly diagrammatic illustration of the essential elements of an interlocking device according to the invention, suitable for this purpose, in a position in which the carrying frame is returned into the position corresponding to the closing position of the trunk lid, shortly before the interlocking operation is initiated, FIG. 4 shows an illustration corresponding to that of FIG. 3, at that point in the approach phase at which the body-side interlocking member is touched via the countermember assigned to the carrying frame, FIG. 5 shows a position of the interlocking device in the approach to the interlocking position, in which the body-side interlocking member is pivoted via the countermember out of a position of readiness (FIG. 4) serving as a blocking position in the direction of the interlocking position, until the blocking position is canceled and further pivoting via the actuating drive is possible, FIG. 6 shows a further position in the interlocking sequence, in which the drive function—transfer of the position of readiness forming a blocking position into an enabling position—initially exerted on the interlocking member by the countermember has changed over to the actuating drive and the interlocking member is pivoted via the actuating drive into a take-up position for the countermember, FIG. 7 shows a next step in the interlocking sequence, in which the interlocking member has pivoted the countermember into the interlocking position completely or virtually completely, and FIG. 8 shows the end position of the interlocking member in the interlocking position of the elements, here the carrying frame and the vehicle body, which are to be connected via the interlocking device, with the interlocking member being secured positively in the interlocking position.

In the detail of a passenger car, illustrated grammatically in FIGS. 1 and 2, the rear of the latter is designated by 1 and the stowage space provided at the rear is designated as a whole by 3. This stowage space 3 comprises a stowaway region for the folding top, designated as a whole by 4, which is illustrated as being closed in FIG. 1 and for which a stowaway position in the stowage space 3 is indicated by dashes in FIG. 2. The stowage space 3, which can be used as a trunk, at least when the folding top is closed, can be closed via a trunk lid 2 which, starting from its closed position in FIG. 1, can be pivoted into an opening position, not illustrated, about a pivot axis 5 lying in its front near-roof region and running in the transverse direction of the vehicle.

The trunk lid 2 is fastened via the pivot axis 5 to a carrying frame 8 which, in turn, is articulated on the vehicle body, to which the trunk lid 2 is to be connected releasably via a lock 6, 7 in the rearward downwardly bent region of said vehicle body.

The carrying frame 8, in turn, is articulated at its rearward lower end on the body via a pivot axis a running in the transverse direction, is capable of being pivoted rearward and upward about this axis and can be transferred, together with the trunk lid 2 carried by it, into an opening position in which the folding top 4 can be folded into the stowage space 3.

The carrying frame 8 is interlocked in the front near-roof region via an interlocking device 10.

With respect to the two elements to be interlocked, to be precise the carrying frame 8 and the body, the interlocking device 10 comprises in each case associated members, of which the interlocking member 13 is provided on the body side in the region of the wheel house 11 and a countermember 12 is provided on the carrying-frame side. The countermember 12 and the interlocking member 13 are indicated merely diagrammatically here, and the design according to the invention of the interlocking device 10, for which only one preferred application is explained with regard to FIGS. 1 and 2, is described in more detail by means of the following figures.

In the exemplary embodiment, according to FIGS. 1 and 2, the interlocking device 10 is assigned an actuating drive 21 which, starting from the interlocking member 13, comprises a cable line 22 which is articulated on a hydraulic cylinder 14. The latter is carried on the body side by a bearing block 20 via a joint bolt 19 so as to be displaceable in the longitudinal direction of the cylinder in a cylinder tube 17 and is articulated with its piston rod 15 on the carrying frame 8 via a pivot bolt 16. When the cylinder 14 is retracted, specifically with the interlocking device 10 detained, the carrying bolt 19 is located in a lower position, not illustrated in the figures, with respect to the cylinder-side long hole 18 provided in the cylinder tube 17, the cylinder tube 17 having the long hole 18 in an extension, adjoining the bottom of the cylinder 14, of said cylinder tube. When the cylinder 14 is then subjected to pressure on its full piston side, the cylinder tube 17 is first displaced in the long hole 18, in relation to the joint bolt 19 held in the bearing block 20, into the upper position illustrated here, specifically at the same time overcoming a sliding resistance which is formed by two leaf springs 23 curved opposite to one another, which run in the direction of the long-hole walls, and act laterally upon the bolt. Along with the downward displacement of the cylinder tube 17, the cable line 22 is tautened, and the interlocking member 13 releases the countermember 12 assigned to the carrying frame 8, so that, as illustrated in FIG. 2, the carrying frame 8 together with the associated trunk lid 2 is displaced into a rearward pivoting position, in which the folding top 4 is accommodated in the stowage space 3. When the cylinder 14 is acted upon in the opposite direction, that is to say on the piston-rod side, the operation takes place in the opposite direction, and the cylinder tube 17 is displaced upward, that is to say toward the carrying frame 8, in relation to the joint bolt 19, as soon as the countermember 12 is supported on the interlocking member 13. With the extension of the cylinder tube 17 into the lower position, not illustrated, in the long hole 18, the cable line 22 is released and consequently the interlocking device 10 is closed.

The invention relates to an interlocking device with a different makeup, which can be used for this purpose and which is explained in more detail below with reference to FIG. 3 ff, this interlocking device being designated as a whole by 30, and being illustrated here merely in terms of the parts essential for understanding the invention. Of these, an interlocking member is designated by 31, a guide mechanism assigned to the latter by 32 and an associated actuating drive by 33. The interlocking member 31, guide mechanism 32 and actuating drive 33 are assigned to the carrying element of the elements to be interlocked via the interlocking device 30, the carrying element being formed, in a similar way to the configuration according to FIGS. 1 and 2, by the diagrammatically indicated vehicle body 34.

In a similar way to FIGS. 1 and 2, the carrying frame 8 corresponds as a counterelement 35, to the vehicle body 34, and, of this counterelement, only the end part terminating in the countermember 36 to the interlocking member 31 is shown, but not the body-side articulation via a pivot axis and its position, so that, in this respect too, reference is made to the basic illustration according to FIGS. 1 and 2.

FIG. 3 shows, for the interlocking member 31—corresponding to the interlocking member 13 in FIGS. 1 and 2—and for the countermember 36—corresponding to the countermember 12 in FIGS. 1 and 2—a position in relation to one another, such as is provided when the carrying frame 35 is pivoted into its closing position, shortly before the interlocking position is reached, the further movement of the countermember 36 in the direction of the interlocking position for the carrying frame 35 being illustrated by the arrow 37.

In the exemplary embodiment, the interlocking member 31 and the countermember 36 are each assigned a coupling member, and this coupling member is formed on the interlocking member 31 by a coupling pin 38 and on the countermember 36 by a coupling mouth 39. The coupling mouth 39 has a mouth plane running transversely to the coupling pin 38 and forms in relation to the coupling pin 38 a catching beak which, with respect to the direction of the arrow 37, has an upper catching flank 40 and a lower detaining flank 41, the catching flank 40 terminating in a nose 43 which extends in the opposite direction to the jaw 42 of the coupling mouth 39 and which extends beyond the detaining flank 41 in the direction of the extent of the latter.

The interlocking member 31 is designed as a lever which is guided via the guide mechanism 32. The latter is designed as a link mechanism and comprises links 44 and 45 which are connected by means of a coupler 46 and of which the base-side articulation points remote from the coupler 46 are fixed to the body and are designated by 47 and 48. The coupler-side articulation points of the links 44 and 45 are designated by 49 and 50. The interlocking member 31, designed as a lever, is connected to the guide mechanism at its articulation points 47 and 50, the articulation point 47 associated with the base and fixed to the body forming the guide point of a positive sliding coupling which, assigned to the interlocking member 31, has a guide slot 51, which extends in the longitudinal direction of the interlocking member 31 and which coincides in the direction of its extent approximately with the straight connecting line between the coupling pin 38 and the articulation point 50 at which the coupler 46 is connected to the link 45. At the other articulation point 49 of the coupler 46, at which the latter is connected to the link 44, the actuating drive 33 engages, specifically via the piston rod 52 of the actuating cylinder 53 which forms the actuating drive 33 and which, in the exemplary embodiment, is designed as a hydraulic cylinder and, as indicated in FIG. 3, is connected on the piston-rod side in an uncontrolled manner to the delivery side of the pump 55 via a volume-compensating pressure accumulator 54. In the opposite direction, the connection to the hydraulic circuit is made, for example, via a 3/2-way valve 56. The different size of the effective surfaces of the piston 57 which are located on both sides, makes it possible, despite permanent action upon this piston side, to adjust the actuating cylinder 53 in the direction of the piston rod 52 when a corresponding activation takes place via the directional valve 56.

In the initial position according to FIG. 3, the actuating cylinder 53 is prestressed on the piston-rod side, that is to say in the direction of retraction, as illustrated. The pull exerted by the piston rod 52 is absorbed via the guide mechanism 32 and supported against the vehicle body 34 at the articulation points 47 and 48, since the mechanism 32 is blocked. This is achieved, in the exemplary embodiment, in that the link 45, connected to the coupler 46 at the piston-rod side articulation point 49 on the coupler 46 and at the articulation point 50, is in an at least stretched, preferably overstretched, position in relation to the coupler 46, specifically being supported in a blocking manner against the other link 44. In the exemplary embodiment, this support is achieved by means of a nose 58 which is assigned to the link 45 and which is supported against a shaped-out portion 59 of the link 44.

Instead of such blocking by appropriate positive connection between members of the guide mechanism 32, there may also be direct support against a body-side stop, such as is indicated by way of example at 60 in FIG. 3.

Within the scope of the invention, however, it is also possible, in spite of a corresponding tensile load being exerted via the actuating drive 33, to ensure a corresponding securing of the locking member 31 in the position according to FIG. 3, when only a virtually stretched position of the coupler 46 and link 45 corresponds to the end position shown, specifically with these being supported resiliently in the direction of their overstretched position. Such resilient support may take place, for example, by means of an overrideable detaining spring, this not being illustrated here, especially since, in the position illustrated, because of the lever positions and lever ratios provided for the guide mechanism 32, there is a deliberately poor transmission ratio for the pull exerted by the actuating cylinder 53.

Proceeding from FIG. 3, therefore, with the interlocking device open, there is for the interlocking member 31, despite corresponding action upon it by the actuating drive 33, a predetermined blocked position in which the interlocking member 31, when it continues to approach the counterelement 35, is acted upon by the countermember 36, as shown in FIG. 4.

In FIG. 4, as in the other figures, the travel 61 of the coupling pin 38 carried by the interlocking member 31 is indicated by dashes and, starting from the initial position according to FIGS. 3 and 4 which show a position of readiness of the interlocking member 31, is executed by virtue of guidance via the guide mechanism 32. Since the position of readiness referred to is a blocking position, as explained by means of FIG. 3, this pivoting operation is initiated, in that the interlocking member 31 is acted upon by the nose 43 of the countermember 36 during approach in the direction of the arrow 37 according to FIG. 1, specifically in such a way that a torque with respect to the articulation point 47 fixed to the body is obtained in the direction rotating to the right in relation to the figures, so that, via the interlocking member 31, functioning as a two-armed lever with respect to the articulation point 47, the articulation point 50 remote from the coupling member 38 pivots the coupler 46 and the link 45 in the opposite direction to the stop-secured end position. Consequently, the blocking position, initially provided in the position of readiness according to FIGS. 3 and 4 is canceled, and the further pivoting of the interlocking member 31 via the actuating drive 33 becomes possible, the guide mechanism 32 being transferred, with respect to the link 44 and the coupler 46, out of an initial position according to FIGS. 3 and 4, in which the coupler 46 and link 44 are at a relatively small angle to one another, increasingly in the direction of a stretched position, with a transmission ratio which improves increasingly over the course of the adjustment travel. FIG. 4 shows, in this respect, the initiation of the pivoting operation, when the counterelement 35 approaches the interlocking member 31, in relation to FIGS. 1 and 2 where the carrying frame 8 approaches its closing position shown in FIG. 1, and FIG. 5 shows an intermediate position, in which the blocking position is canceled and the coupling pin 38 of the interlocking member 31, on the one hand, is pressed via the nose 43 of the countermember 36 and, on the other hand, is introduced further into the coupling mouth 39 via the interlocking member 31 under the influence of the pull of the actuating drive 33.

FIG. 6 shows, furthermore, that, in the course of the further run of the coupling pin 38 into the coupling mouth 39, this time solely as a result of the pivoting movement of the interlocking member 31 due to its guidance via the guide mechanism 32, the coupling pin 38 runs up against the detaining flank 41 and thus, further along the pivoting travel, takes up the countermember 36 and the counterelement 35 carrying the latter in the closing direction. At the same time, as FIGS. 6 and 7 show, the supporting triangle, formed by the coupler 46 and the link 44, for the piston rod 52 articulated at the articulation point 49 is stretched increasingly, so that an improved transmission ratio is obtained, this effect also being reinforced in that the actuating force introduced on the interlocking member 31 via the guide mechanism 32 likewise takes effect with an increasingly more favorable lever ratio.

According to FIG. 7, the interlocking position is reached when the link 44 and the coupler 46 have reached at least virtually a stretched position, and, according to FIG. 8, the interlocking position is secured in a way preferred according to the invention, in that the link 44 and coupler 46 reach an overstretched position which is stop-secured. The relevant stop is designated in FIG. 8 by 62, is fixed to the body and is assigned preferably to the link 44 in such a way that it cooperates with the latter in the region of its shaped-out portion 59. The shaped-out portion 59 is formed, with respect to the exemplary embodiment illustrated, by the vertex region of the link 44, in the case of a triangular design of the latter, the base of the triangle being formed by the straight connecting line of the articulation points 47 and 49. A comparison of FIGS. 3 and 8 shows that, of the flanks of the link 44 which limit the vertex angle, in each case a different one cooperates with the associated stop, that is to say with the nose 58 of the link 45 in FIG. 3 and with the body-side stop 62 in FIG. 8. The interlocking position according to the invention, secured in FIG. 8 by the beyond dead center position, ensures that the interlock is secured, even when the hydraulics are pressureless.

As the figures illustrate, the guide mechanism 32 is designed as a link mechanism and forms a four-bar linkage, in which the links 44, 45 have essentially the same length and the length of the coupler 46 corresponds approximately to the length of the links 44, 45, preferably is somewhat greater than this. The length of the base, that is to say the distance between the articulation points 47 and 48, is of the order of magnitude of 1.5 times the link length.

The direction of extent of the interlocking member 31, said direction being defined by the straight connecting line of the coupling bolt 38 and the mechanism-side articulation point 50, is at a relatively small angle to the direction of extent of the base, while, with respect to this angle opening in the direction of the countermember 36, the flank surface 63 of the flank 40 terminating in the nose 43 runs at a greater angle 65 to this straight connecting line than the direction of extent of the base (angle 66), in relation to which the guide slot 51 has an approximately parallel run in the position of readiness in accordance with FIG. 3.

A hydraulic drive is shown as the actuating drive 33 in the exemplary embodiment, but, within the scope of the invention, other drive forms, for example mechanically via a Bowden cable, or electrically, are also possible.

It is advantageous, within the scope of the invention, that, in a reversal of the closing operation the interlocking device may also serve for lifting the countermember out of its position corresponding to the interlocking position into a slight opening position and may thus contribute to overcoming breakaway forces possibly occurring during opening or to making it possible to have a lower-powered design of an actuating drive necessary for the further opening of the countermember.

So that the forces which are necessary for overcoming the position of readiness as blocking position and which are to be transmitted by the counterelement 35 are kept low, it proves expedient if the flank surface 63 of the catching flank 40 is at an angle of the order of magnitude of about 45 to 60 degrees to the path of movement, determined via the guide mechanism 32, of the coupling pin 38, in order to achieve sufficient adjustment travels in the direction of the jaw 42 of the coupling mouth 39, along with justifiable frictional forces, since, in spite of the desired small space-saving form of construction, also achieved according to the invention, there must be a sufficient overlap between the coupling pin 38 and the catching flank 40 so that even relatively pronounced tolerances can be compensated and to ensure reliable grasping on the one hand, and reliable interlocking, on the other hand.

With a view to the desired space-saving design, it is also expedient for the interlocking member 31 to be produced as a double-edged lever, between which the countermember 36 engages with the single-edged carrying flank 40 and detaining flank 41.

What is claimed is:

1. A device for interlocking of two positively guided elements adjustable relative to one another in an interlocking position, in which the guided elements are operatively connected so as to be adjacent to one another for interlocking of a part covering a vehicle orifice with the vehicle body, in which one of the guided elements forms a carrying element for a guide mechanism with an interlocking member, in which the other of the guided elements is provided as counterelement with a countermember, in which the interlocking member is arranged to be transferred via the guide mechanism out of a position of readiness for grasping the countermember into an interlocking position for the grasped countermember, said interlocking position corresponding to the interlocking position of the guided elements, and in which the guide mechanism configured as a four-bar linkage mechanism is connected to an actuating drive, and means is provided for blocking the interlocking member against adjustment by the actuating drive in a direction of its interlocking position and for transferring the interlocking member out of a blocking position via the counterelement, when the latter approaches the interlocking position of the elements, into a position enabling adjustment via the actuating drive in the direction of the interlocking position.

2. The device as claimed in claim 1, wherein the interlocking member is configured to be transferred via the countermember into a position enabling its adjustment via the actuating drive in the direction of the interlocking position.

3. The device as claimed in claim 1, wherein the position of readiness as blocking position, is stop-secured.

4. The device as claimed in claim 1, wherein the position of readiness, as blocking position, is spring-secured.

5. The device as claimed in claim 1, wherein the link mechanism is configured so that, with respect to a predetermined actuating force of the actuating drive, the interlocking member is subjected to maximum load in the region of its interlocking position.

6. The device as claimed in claim 1, wherein the four-bar linkage has an end position corresponding to the position of readiness and an end position corresponding to the interlocking position.

7. The device as claimed in claim 1, wherein the actuating drive is prestressed in the direction of the interlocking position.

8. The device as claimed in claim 1, wherein, of the links connecting a base and a coupler of the four-bar linkage, one link is approximately in alignment with the coupler, in a position corresponding to the position of readiness, and the other link is approximately in alignment with the coupler, in an end position corresponding to the interlocking position.

9. The device as claimed in claim 8, wherein the interlocking member is connected to the link mechanism at the articulation point of one link on the coupler.

10. The device as claimed in claim 8, wherein the actuating drive is connected to the link mechanism at the articulation point of one link on the coupler.

11. The device as claimed in claim 8, wherein the actuating drive and the interlocking member are connected to the link mechanism in each case at a different one of the two articulation points of the coupler on the links.

12. The device as claimed in claim 8, wherein the interlocking member is mounted by a positive sliding coupling at a guide point in position in relation to the base of the four-bar linkage.

13. The device as claimed in claim 12, wherein the guide point of the positive sliding coupling is formed by one of the base-side articulation points of the link mechanism.

14. The device as claimed in claim 12, wherein the base-side articulation point forming the guide point of the positive sliding coupling is assigned to the link, at whose articulation point on the coupler the actuating drive engages.

15. The device as claimed claim 14, wherein the positive sliding coupling comprises a guide slot which extends in the direction of extent of the straight connecting line of the articulation point between the interlocking member and the coupler and the coupling member assigned to the interlocking member.

16. The device as claimed claim 15, wherein the links have approximately the same length.

17. The device as claimed claim 16, wherein the coupler is longer than a link.

18. The device as claimed claim 17, wherein, with respect to the position of readiness, a force action line of the actuating drive coincides with the bisecting line of the angle formed by the coupler and the link articulated at the guide point of the interlocking member.

19. The device as claimed in claim 18, wherein, in the interlocking position corresponding to the interlocking position of the elements, the coupler and the link articulated at the guide point, assume approximately a stretched position.

20. The device as claimed in claim 19, wherein in the interlocking position corresponding to the interlocking position of the elements, the coupler and the link articulated at the guide point of the interlocking member assume a position overstretched in the direction of the base of the four-bar linkage.

21. The device as claimed in claim 19, wherein, in the interlocking position corresponding to the interlocking position of the elements, the coupler and the link articulated at the guide point of the interlocking member have an extent approximately perpendicular to the action line of the actuating force of the actuating drive.

22. The device as claimed in claim 21, wherein the length of the guide slot corresponds approximately to the length of the coupler.

23. The device as claimed in claim 1, wherein the interlocking member is configured to be released from its blocking position via the countermember assigned to the counterelement.

24. The device as claimed in claim 23, wherein the interlocking member and the countermember are each assigned a coupling member.

25. The device as claimed in claim 24, wherein one of the coupling members is a coupling pin and the other is a coupling mouth.

26. The device as claimed in claim 25, wherein the interlocking member, as coupling member, carries a coupling pin.

27. The device as claimed in claim 25, wherein the countermember, as coupling member, hash a coupling mouth.

28. The device as claimed in claim 27, wherein the coupling mouth extends in the pivoting direction of the interlocking member.

29. The device as claimed in claim 27, wherein the coupling mouth has, with respect to the coupling pin, a catching flank engaging over the latter in the interlocking position and a detaining flank engaging under said coupling pin.

30. The device as claimed in claim 29, wherein the catching flank is assigned to a nose projecting beyond the detaining flank in a direction opposite to the jaw of the coupling mouth.

31. The device as claimed in claim 27, wherein the interlocking member and the coupling mouth extend approximately perpendicularly to one another.

32. The device as claimed claim 1, wherein the interlocking member, in its position of readiness, assumes a position in which its mechanism-side articulation point, its guide point and its coupling member lie approximately on a straight connecting line.

33. The device as claimed in claim 32, wherein the direction of extent of the straight connecting line in the position of readiness corresponds approximately to the direction of extent of the base of the four-bar linkage.

34. The device as claimed in claim 32, wherein, with respect to the position of readiness, the link articulated at the guide point and the coupler are at an acute angle to one another.

35. The device as claimed claim 33, wherein with respect to the position of readiness, the coupler and the link connected to it at the articulation point of the interlocking member have approximately the same direction of extent.

36. The device as claimed in claim 35, wherein the coupler and the link connected thereto at the articulation point of the interlocking member assume a position overstretched in the direction of the guide point.

37. The device as claimed in claim 35, wherein the coupler and the link connected thereto at the articulation point of the interlocking member assume a stretched position.

38. The device as claimed claim 35, wherein, with respect to the position of readiness, the coupler and/or the link connected to it at the articulation point of the interlocking member are spring-loaded in the direction of the guide point.

39. The device as claimed claim 35, wherein, with respect to the position of readiness, the coupler and/or the link connected to it at the articulation point of the interlocking member are stop-limited in the pivoting travel toward the guide point.

* * * * *